United States Patent
Bohorquez et al.

(10) Patent No.: US 10,865,323 B2
(45) Date of Patent: Dec. 15, 2020

(54) AMINE FUNCTIONAL ANIONIC POLYMER DISPERSION AND COATING COMPOSITIONS THEREOF

(71) Applicant: Allnex Netherlands B.V., Bergen op Zoom (NL)

(72) Inventors: Silfredo Javier Bohorquez, Bergen op Zoom (NL); Dirk Emiel Paula Mestach, Nijlen (BE)

(73) Assignee: Allnex Netherlands B.V., Bergen op Zoom (NL)

( * ) Notice: Subject to any disclaimer, the term of this patent is extended or adjusted under 35 U.S.C. 154(b) by 202 days.

(21) Appl. No.: 16/098,159

(22) PCT Filed: May 2, 2017

(86) PCT No.: PCT/EP2017/060414
§ 371 (c)(1),
(2) Date: Nov. 1, 2018

(87) PCT Pub. No.: WO2017/191131
PCT Pub. Date: Nov. 9, 2017

(65) Prior Publication Data
US 2019/0144702 A1    May 16, 2019

(30) Foreign Application Priority Data
May 2, 2016 (EP) .................................... 16167980

(51) Int. Cl.
| | | |
|---|---|---|
| *C09D 133/12* | (2006.01) | |
| *C09D 5/00* | (2006.01) | |
| *C08F 265/06* | (2006.01) | |
| *C08F 2/26* | (2006.01) | |
| *C09D 151/00* | (2006.01) | |

(52) U.S. Cl.
CPC ............ *C09D 133/12* (2013.01); *C08F 2/26* (2013.01); *C08F 265/06* (2013.01); *C09D 5/00* (2013.01); *C09D 151/003* (2013.01)

(58) Field of Classification Search
USPC ....................................................... 524/460
See application file for complete search history.

(56) References Cited

U.S. PATENT DOCUMENTS

| | | | | |
|---|---|---|---|---|
| 4,760,110 A | * | 7/1988 | Das ...................... | C08F 285/00 524/460 |
| 5,962,571 A | * | 10/1999 | Overbeek ................ | C08F 8/30 428/460 |
| 6,040,380 A | | 3/2000 | Dunaway et al. | |

FOREIGN PATENT DOCUMENTS

| | | | |
|---|---|---|---|
| CN | 1168400 A | 12/1997 | |
| CN | 1965042 A | 5/2007 | |
| CN | 103443146 A | 12/2013 | |
| CN | 104781297 A | 7/2015 | |
| EP | 0587333 A2 * | 3/1994 | ............ C08F 265/06 |
| EP | 0811663 A2 | 12/1997 | |
| WO | 2005121595 A2 | 12/2005 | |
| WO | 2012130817 A1 | 10/2012 | |
| WO | 2014021840 A1 | 2/2014 | |
| WO | 2014039302 A1 | 3/2014 | |
| WO | 2016209692 A1 | 12/2016 | |

OTHER PUBLICATIONS

Hansen, "Hansen Solubility Parameters, A User's Handbook," 2nd ed., CRC Press, 2007, pp. 8, 29. (Year: 2007).*
International Search Report dated Jun. 14, 2010 for Application No. PCT/EP2017/060414.

* cited by examiner

*Primary Examiner* — Fred M Teskin
(74) *Attorney, Agent, or Firm* — Hoyng Rokh Monegier LLP; David P. Owen

(57) ABSTRACT

The invention relates to a process and the product obtainable by the process for the preparation of an aqueous anionically stabilized polymer dispersion comprising a first emulsion polymerization of a first monomer mixture comprising acid functional monomers and substantially no amine functional monomers to form a the first phase oligomer, neutralising and a second emulsion polymerisation in the presence of the emulsion of the first phase of a second monomer mixture comprising amine functional monomers having sterically hindered secondary amine or tertiary amine groups and substantially no acid functional monomers to form a second phase of an amine functional polymer wherein the two phases are unmixed and separate. The invention further relates to the dispersions further comprising reactive and/or non-reactive co-binder, in particular polyepoxide co-binder and also relates to the use of the dispersions for preparation of coating compositions and coatings with anti-bleeding properties.

13 Claims, No Drawings

AMINE FUNCTIONAL ANIONIC POLYMER DISPERSION AND COATING COMPOSITIONS THEREOF

CROSS REFERENCE TO RELATED APPLICATIONS

This application is a 371 of PCT application number PCT/EP2017/060414 filed on May 2, 2017, which claims priority from EP application number 16167980.8 filed on May 2, 2016. All applications are hereby incorporated by reference in their entireties.

The invention relates to a process for the preparation of aqueous dispersions of anionic polymers comprising both amine and acid functionality. The invention further relates to coating compositions further comprising reactive or non-reactive co-binders, in particular a polyepoxy hardener as reactive co-binder and the use of the coating composition for preparation of coatings with anti-bleed or anti-microbial properties. The aqueous coating compositions of the present invention have fast dry characteristics and upon drying quickly develop good water and chemical resistance properties. Such compositions are useful as coatings on wood, metal, and other surfaces, either as a one- or two-component formulations.

Incorporation of amine functional ethylenically unsaturated monomer in an aqueous polymer dispersion also containing acid functional ethylenically unsaturated monomers is difficult. Even at low concentrations of the amine functional monomer at a pH of less than 7, which is normally the case in anionic persulphate initiated emulsion polymerizations, cationic oligomeric or polymeric species can be formed which cause coagulation or flocculation of the anionic emulsion polymer. Because of this, it is difficult to synthesize an emulsion polymer comprising both alkyl substituted amine functional and acid functional monomers that has good stability.

Coating compositions based on aqueous anionic polymer dispersions comprising both amine and acid functionality are known in the art. In Brinkman et al. (Progress in Organic Coatings, 34, 1998, p 21-25) and in WO 02/068551 polymer dispersions bearing both amine and acid functionality are described that are prepared using conventional solution polymerization techniques, followed by emulsification of the polymer in water. Reference is made to the combination with epoxy-functional polymer dispersions to yield cross-linked coatings. However, there are some disadvantages with these coating compositions as the process followed for the synthesis of the polymer bearing the amino and acid groups is cumbersome and time consuming. Furthermore, the solvent that was used for the solution polymerization has to be removed by means of vacuum distillation, resulting in waste products and added cost. As a consequence there is a need for a process for the manufacture of waterborne dispersions of amine and acid functional polymers that is easier and more cost-effective.

Mandavian, et al. (Adv. In Polym. Tech. 276 (2011)) describe a complete study for the preparation of poly (methyl methacrylate-co-butyl acrylate) waterborne nanoparticles that are surface functionalized with amino groups. The methods employed to prepare such dispersions included seeded emulsion and mini emulsion polymerization. The latexes are claimed to be film forming. The concentration of amine-functional and carboxylic groups in the polymer is rather low at 1.8 wt % and 0.03 wt %, respectively.

U.S. Pat. Nos. 4,760,110 and 3,404,114 describe a two-stage emulsion polymerization process with an intermediate neutralization step that allows for the incorporation of higher levels of amino and carboxylic acid functional monomers. However, the amino and acid levels are relatively low.

EP0794018 describes an aqueous coating composition having a dispersion of acrylic polymers with acid and amine-functional groups wherein the amine functional groups are in a non-ionic state due to the pH level of such dispersion. The amine and acid functional polymer is prepared in a single polymerization step and the level of amine and acid monomers in the polymer are low; the amine monomer content in the examples is not higher than 7 wt % and the amount of acid monomers in the examples is not higher than 2 wt %.

Due to the increasing legislative pressure on reducing emissions of volatile organic compounds (VOC) from coatings, there still is a need for aqueous coating compositions that have improved fast dry characteristics and which quickly develop good water and chemical resistance properties.

According to the invention there has been provided a process for the preparation of an aqueous anionically stabilized polymer dispersion comprising the steps a. a first emulsion polymerization of a first monomer mixture comprising acid functional monomers M1 comprising acid groups and less than 2 wt % (relative to the total weight of the first monomer mixture), preferably substantially no, amine functional monomers M2 comprising amine groups to form a first phase polymer dispersion of an acid functional oligomer P1 having a number average molecular weight $Mn_{P1}$ between 500 and 50,000 g/mole, preferably 1000 and 30,000 gr/mole (as determined by GPC using THF in combination with acetic acid) and a Fox glass transition temperature $Tg_{P1}$ of at least 0, preferably at least 10, 15 or even at least 20° C., b. adding a base preferably a volatile base, preferably ammonia, to increase the pH in a range between 6 and 11, preferably between 7.5 and 11, c. a second emulsion polymerisation in the presence of the first phase polymer dispersion of a second monomer mixture comprising amine functional monomers M2* having sterically hindered secondary amine or tertiary amine groups and less than 2 wt % (relative to the total weight of the second monomer mixture), preferably substantially no acid functional monomers M1 to form a second phase of an amine functional polymer P2 having a Fox glass transition temperature $Tg_{P2}$ of at least 0° C.

d. wherein $Tg_{P2}$ is lower than $Tg_{P1}$ by at least 5° C., more preferably at least 7, 10 or 20° C., and e. wherein the resulting anionically stabilized polymer dispersion comprises dispersed particles having within the particles separate unmixed first and second phases, wherein the Fox Tg is calculated based on constituting monomers in the monomer mixtures not including chain transfer agents or reactive surfactants.

The invention also relates to aqueous anionically stabilized polymer dispersions obtainable by the process, in particular to an aqueous anionically stabilized polymer dispersion comprising dispersed particles having within the particles two or more separate phases, one phase comprising an acid functional oligomer or polymer having substantially no amine functional monomers and another separate phase comprising amine functional polymer or oligomer having substantially no acid functional monomers and wherein the amount of amine functional monomers is at least 4 wt % relative to the total weight of the polymers or oligomers in the dispersed particles.

These dispersions are referred to as anionic polymer dispersions and as "anionically stabilized" dispersions, meaning that in the liquid state, the surface of the polymer dispersion particles carry a negative charge that is balanced by the presence of cations in the liquid phase. The dispersions according to the invention are very useful for the preparation of fast drying waterborne coatings, in particular coating compositions for functional coatings on metal, mineral and wooden substrates.

The invention also relates to coating compositions comprising the aqueous anionic polymer dispersion of the invention with or without co-binder which can be reactive (as a two-component coating system) or non-reactive (as a one-component coating system) with the amine or acid groups of the aqueous anionic polymer.

A preferred embodiment of the present invention is an aqueous two component coating composition comprising: as a first component an anionic aqueous polymer dispersion made by emulsion polymerization, said dispersion comprising a multitude of polymer particles containing at least two distinct polymeric phases P1 and P2, with one phase (P1) having pendant acid functional groups and another phase (P2) has pendant alkyl substituted amine functional groups, and as a second component a compound having pendant functional groups that are co-reactive with the acid and/or amine functional groups of the first component, which coating composition forms a cross-linked polymer network upon drying.

In particular the invention relates to coating compositions comprising the aqueous anionic polymer dispersion blended with an aqueous dispersion of a polyepoxide reactive co-binder and to the use thereof in coatings providing anti-bleed or anti-microbial properties.

The invention also relates to a method for producing a fast drying coating having early water- and chemical resistance properties on a suitable substrate, comprising: applying a layer of an anionic aqueous polymer dispersion made by emulsion polymerization consisting of a multitude of polymer particles containing at least two distinct polymeric phases, with one phase having pendant acid functional groups and another phase has pendant alkyl substituted amine functional groups.

The first process step is a first emulsion polymerization of a first monomer mixture comprising acid functional monomers M1 comprising acid groups and less than 2 wt %, more preferably less than 1 wt % and even more preferably less than 0.5 wt % (relative to the total weight of the first monomer mixture) amine functional monomers M2 comprising amine groups. It is preferred that the first monomer mixture comprises substantially no amine functional monomers M2 comprising amine groups because amine groups will destabilize the dispersion of the acid functional oligomer P1. In this step an emulsion of a first phase of an acid functional oligomer P1 is formed having a number average molecular weight $Mn_{P1}$ between 500 and 50,000 g/mole, preferably 1,000 and 30,000 g/mole (as determined by gel permeation chromatography (GPC) using tetrahydro furane in combination with acetic acid). The $Mn_{P1}$ should not be too high in view of the viscosity of the oligomer dispersion at a pH above 6 and not too low in view of achieving sufficient chemical and water resistance properties. The acid functional oligomer has a glass transition temperature calculated according to the Fox-equation $Tg_{P1}$ of at least 0, preferably at least 10, 15 or 20° C., but preferably at least 30° C. and possibly more than 50° C. in view of the envisaged coating properties. The Fox Tg is calculated based on constituting monomers in the monomer mixtures not including chain transfer agents or reactive surfactants.

Subsequently a base is added, preferably a volatile base, to increase the pH in a range between 6 and 11, preferably between 7.5 and 11. In step b the pH is increased to hydro-plasticize the acid functional oligomer and to keep during and after the second polymerization step c the sterically hindered secondary amine or tertiary amine groups are in deprotonated state. The pH can be raised by adding bases such as: ammonia; alkali metal hydroxides, such as sodium hydroxide or lower alkyl amines, such as but not limited to 2-methylaminoethanol, 2-dimethylethanolamine, N-methylmorpholine, N,N diisopropyl ethyl amine and triethylamine. Volatile bases, such as ammonia, or a mixture of volatile bases and non-volatile bases are preferred; and ammonia or 2-dimethylethanolamine are most preferred.

The second emulsion polymerization takes place in the presence of the first stage polymer dispersion by addition of a second monomer mixture comprising amine functional monomers having sterically hindered secondary amine or tertiary amine groups and less than 2 wt % (relative to the total weight of the second monomer mixture), preferably substantially no acid functional monomers to form a second phase of an amine functional polymer P2 having a Fox glass transition temperature $Tg_{P2}$ of at least 0° C.

The amine functional polymer P2 has a number average molecular weight $Mn_{P2}$ that can vary between wide ranges, typically between 1,000 and 1,000,000, preferably 10,000 and 800,000 g/mole. The first stage oligomer P1 typically has a lower molecular weight than the second stage polymer and $Mn_{P2}$ is higher than $Mn_{P1}$ preferably by at least 1,000 g/mole, more preferably at least 2,000, 4,000 or 8,000 g/mole. The control of molecular weight is described below in more detail.

The monomers of the first and second monomer mixture are chosen such that $Tg_{P2}$ is lower than $Tg_{P1}$ at least 5° C., more preferably at least 7, 10 or 20° C., but a differences can be at least 25 or even 30° C. The Fox Tg herein is calculated based on constituting monomers in the monomer mixtures not including chain transfer agents or reactive surfactants as explained below in more detail.

The particle size of the resulting polymer dispersions will generally vary between 20 and 1000 nm, and preferably between 50 and 500 nm (Z average mean value as determined by photon correlation spectroscopy). When the amine-functional anionically stabilized dispersion is used in combination with a co-reactive dispersion, it is favorable that the particle sizes of both polymer dispersions are similar.

The number and weight average molecular weights ($M_n$ and $M_w$) of the oligomeric copolymer P1 may be determined by means of GPC using a polymer, such as polystyrene, of known molecular weight as a standard and tetrahydro furane or a combination of tetrahydro furane and acetic acid as an eluent. For polymer P2, the $M_n$ and $M_w$ was calculated using a mathematical model represented in a computer program described by C. Sayer et al. (Computers and Chemical Engineering 25 (2001), 839).

The $T_g$ of the first and second phase copolymers are calculated by the Fox-equation (T. G. Fox, Bull. Am. Phys. Soc. 1 (1956), 123). The Fox equation, which is well known in the art, is represented by the formula: $1/T_g = W_1/T_g(1) + W_2/T_g(2) + W_3/T_g(3) + \ldots$, wherein $W_1$, $W_2$, $W_3$, etcetera, are the weight fractions of the co-monomers (1), (2), and (3), (etcetera), and $T_g(1)$, $T_g(2)$, $T_g(3)$ mean the glass transition temperatures of their respective homopolymers (expressed in Kelvin). Glass transition values for homopolymers given in the Polymer Handbook, 4th edition (editors: J. Brandrup, E. H. Immergut, E. A. Grulke, John Wiley & Sons, Inc. 1999) can be used to perform the calculation. The calculated $T_g$ in degrees Kelvin may be readily converted to degrees Celsius. When calculating the $T_g$ according to Fox, the effect of other constituents of the polymer such as cross-linking monomers carrying multiple vinyl groups, chain transfer agents or reactive surfactants is not taken into account. The $T_g$ value is also not corrected for molecular weight effects.

It is not intended to limit the morphology of the alkyl substituted amine-functionalized polymer dispersions particles of the present invention in any way, but they are required to contain at least two distinct polymer phases; the polymers are unmixed. Multi-phased particles will comprise at least two mutually incompatible copolymer phases P1 and P2 having any of a number of morphological configurations—for example: core/shell; core/shell particles with shell phases incompletely encapsulating the core; core/shell particles with a multiplicity of cores or core/shell particles where the core consist of two phases or has a gradient composition. In order for polymers to be mutual incompatible it is required that there is a certain minimum difference in solubility parameters between the polymers P1 and P2. This can be approximated by a difference in the solubility parameters $\delta_T$ ($\Delta\delta_T$) of the copolymers from each phase as calculated using the combined methods of Hoy (Hoy KL. "New values of the solubility parameters from vapour pressure data", J. Paint Technology, 1970, 42(541):76-118) and Van Krevelen/Hoftzyer ("Properties of polymers: their correlation with chemical structure; their numerical estimation and prediction from additive group contributions", $3^{rd}$ edition, Amsterdam: Elsevier; 1990.) represented by the formula: $\delta_T=[(\delta_{d,p})^2+(\delta_{p,p})^2+(\delta_{h,p})^2]^{1/2}$, wherein $\delta_{d,p}$, $\delta_{p,p}$ and $\delta_{h,p}$ are respectively the Hansen dispersion, polar and hydrogen bonding solubility components for the polymer (Hansen et al., "Independent calculation of the parameter components", J. Paint Technology, 1967; 39(511): 511-4). For the calculation, only the polymer constituents as also described for the Fox Tg calculation are taken into account (i.e. based on the constituting monomers in the monomer mixtures not including chain transfer agents or reactive surfactants). The requirement for having phase separation between the polymers of the present invention is to have $\delta_{TP1}$ different from $\delta_{TP2}$ by at least 0.1, i.e. a $\Delta\delta_T$ of at least 0.1 or preferably at least 0.2. It is more preferred that the difference $\Delta\delta_T$ is at least 0.3.

Experimental techniques to establish whether there are separate phases in the morphology of polymer dispersion particles, in particular of separate phases of P1 and P2, include electron microscopy (see for example Winnik et al., Langmuir, Volume 9, Issue 8, p 2053-65 (1993)), dynamical mechanical thermal analysis (Rearick et al., Journal of Coatings Technology, Volume 68, Issue 862, p 25-31 (1996)) or differential scanning calorimetry (Stubbs et al., Journal of Polymer Science, Part B: Polymer Physics, Volume 43, Issue 19, p 2790-2806 (2005).

It is preferred that in the process of the invention the first monomer mixture comprises a. between 1 and 20, preferably 2-15, more preferably 3-10 wt % of the acid functional monomers M1,
b. less than 1 wt %, preferably less than 0.5 wt % and most preferably no amine functional monomers M2,
c. between 80 and 99, preferably 85-98 wt %, more preferably 90-97 wt % monomers M3 other than acid- and amine functional monomers,
and wherein the second monomer mixture comprises
d. between 2 and 45 wt %, preferably between 3 and 35 wt %, and more preferably between 5 and 30 wt % of the amine functional monomers M2* having sterically hindered secondary amine or tertiary amine groups,
e. less than 1 wt %, preferably less than 0.5 wt % and most preferably no acid functional monomers M1,
f. between 55 and 98, preferably between 65 and 98 wt %, more preferably 75 or 78 to 96 wt % monomers M3 other than acid- and amine functional monomers,
wherein the wt % are relative to the total weight of the first and second monomer mixture respectively and wherein preferably the amounts of M1, M2 and M3 in each mixture add up to 100 wt %. Preferably the monomers M3 in c) and f) are monomers not comprising an ionisable group and may optionally comprise crosslinkable groups other than amine and acid groups. The second monomer mixture does not comprise amine functional monomers other than amine functional monomers M2* having sterically hindered secondary amine or tertiary amine groups. High amounts of amine functional monomers in P2 (say above 25 wt %) are more difficult in view of dispersion stability but in view of the anti-bleed properties the amount of amine monomers M2* in P2 is chosen as high as possible and amounts of more than 25, 30 or even 35 wt % are desirable and achievable in the process of the invention.

The amount of the second monomer mixture in wt % relative to the total of the first and second monomer mixture, and accordingly the amount of polymer P2 over the total of P1+P2, is typically between 20 and 80, more preferably between 25 and 70 wt %. The relative amount of P2 is preferably high in view of providing a high amount of amine groups for anti-bleed properties so preferably the relative amount is above 30, 40, 50 or even above 60 wt %. In view of dispersion stability between 30 and 60 wt % is favoured.

The first phase containing an oligomeric copolymer P1 is derived from the emulsion polymerization of acid functional monomers M1, monomers M3 and substantially no amine functional monomers M2 and a chain transfer agent for molecular weight control. The second phase contains a copolymer P2 derived from a second monomer mixture amine functional monomers M2* having sterically hindered secondary amine or tertiary amine groups, monomers M3 and substantially no acid functional monomers M1. Appropriate choices for monomers M1, M2 and M3 in copolymers P1 and P2 are described below. The monomers M3 preferably are monomers comprising substantially no ionizable group and may optionally comprise crosslinkable groups other than amine and acid groups. "Substantially no" here means less than 5, preferably 2, more preferably less than 1 wt %.

The acid-functional vinyl monomers M1 used may be selected broadly from carboxylic acids, phosphonic acids, acid anhydrides, phosphate monomers, and other functionalities which are capable of reacting with a base to form a salt. Examples of carboxylic acid functional monomers include (meth)acrylic acid, itaconic acid or anhydride, maleic acid or anhydride, citraconic acid or anhydride beta-carboxyethyl acrylate, monoalkyl maleates (for example monomethyl maleate and monoethyl maleate) and monoalkylcitraconates. Besides carboxylic acid functional monomers also other acid functional monomers can be present in the monomer composition such as but not limited to styrene sulphonic acid, vinylbenzyl sulphonic acid, vinylsulphonic acid, acryloyloxyalkyl sulphonic acids (e.g. acryloyloxymethyl sulphonic acid), 2-acrylamido-2-alkylalkane sulphonic acids (for example 2-acrylamido-2-methylethane sulphonic acid), 2-methacrylamido-2-alkylalkane sulphonic acids (for example 2-methacrylamido-2-methylethanesulphonic acid), mono(acryloyloxyalkyl)phosphates (for example, mono(acryloyloxyethyl) phosphate and mono (3-acryloyloxypropyl) phosphates) and mono-(methacryloyloxyalkyl) phosphates.

The amount of acid functional monomer present in the alkyl substituted amine-functionalized polymer will vary, depending on the acid utilized, and the method of preparation, but in general an amount of 15 wt % or less of acid functional monomer (based on the weight of the total monomer composition) will be used in P1. It is preferred to use between 1-10 wt % of acid functional monomer in P1. The neutralized carboxylic acid groups provide stabilization to the dispersion, but also react with epoxy. Further these groups also catalyze the reaction between epoxy and the amine groups. The amount of acid is otherwise preferably chosen not too high in view of maintaining good water resistance of the resulting coating. The amount of acid monomers in the polymer dispersion can be at least 2, 3, 6 or even 8 wt % relative to the weight of oligomer P1 and at least 1, 3 or even 4 wt % relative to the total weight of P1+P2.

The amine functional monomers M2* having sterically hindered secondary amine or tertiary amine groups to be used in the second monomer mixture in the process of the invention can be selected from a broad class of monomers. It is an advantage of the invention that both water-soluble and water-insoluble amine group-containing monomers can be employed with good conversion without coagulation. Preferred amine-functional monomers M2* are alkyl substituted amine functional ethylenically unsaturated monomers defined by the structure below:

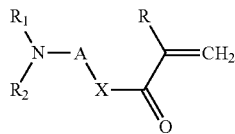

wherein R is hydrogen, an alkyl group having 1 to 4 carbon atoms or a phenyl group, A is an alkylene group having from 2 to 10 carbon atoms, X is oxygen or nitrogen, preferably oxygen. R1 and R2 are each independently an alkyl group having 1 to 12 carbon atoms or, in case of a sterically hindered secondary amine R1 is hydrogen and R2 is a sterically hindering alkyl group, in particular R2 comprises 4 or more carbon atoms, preferably t-butyl.

Illustrative examples of the alkyl substituted amine monomers M2* include dimethylaminoethyl acrylate and methacrylate, diethylaminoethyl acrylate and methacrylate, dimethylaminopropyl acrylate and methacrylate, dipropylaminoethyl acrylate and methacrylate, di-n-butylaminoethyl acrylate and methacrylate, di-sec-butylaminoethyl acrylate and methacrylate and di-t-butylaminoethyl acrylate and methacrylate, monoamides of diamines of ethylenically unsaturated carboxylic acids, such as, for example, N, N-dimethylaminopropyl acrylamide and N, N-dimethylaminopropyl methacrylamide. Most preferred alkyl substituted amine functional ethylenically unsaturated monomers are dimethylaminoethyl methacrylate and para-tertiary butyl methacrylate.

It is a particular advantage of the present invention that the amount of amine groups and the amount of acid groups in the polymer can be high, resulting in improved coating properties, in particular improved anti-bleeding properties, without risking dispersion stability. In particular, the amount of amine monomers can be at least 5, preferably at least 7, 10, 15 more preferably at least 20 or even higher than 30 wt % relative to the weight of polymer P2 and at least 5, 8, 10 or even at least 15 wt % relative to the total weight of oligomer and polymer P1+P2. The amount of acid plus amine monomers in the polymer dispersion can be at least 5, 10, 15 or even at least 20 wt % (relative to P1+P2).

The amount of amine monomer present in the polymer dispersions of the present invention will vary depending on the amine utilized and the method of preparation, but in general an amount of 2 wt % or greater of amine functional monomer (based on the total weight of the monomer) will be used. It is preferred to use between 3-30 wt % of amine functional monomer, most preferably, between 5-25 wt % of amine functional monomer in P2. In a one-component embodiment, i.e. without a reactive co-binder, the amine group will become protonated by the carboxylic acid groups from the first polymer phase, thus forming an ionic cross-link. In both one-component and two-component embodiments the presence of quaternized or protonated amine groups contributes to the adhesion properties of the dried coating film onto the substrate. Further in a two-component composition with a polyepoxide co-binder, the amine groups provide crosslinking with the epoxy groups and will be converted to quaternized amine functionality. This positively charged group will form a complex with extractables from wood (tannins, tree-resins) and also provide antimicrobial functionality.

The remainder of the monomer composition is made up of "non-ionic" vinyl monomers M3, meaning monomers that different from monomers M1 and M2 do not contain an ionizable group. In general it is preferred that the monomers M3 are selected from aliphatic or aromatic saturated or unsaturated vinyl monomers.

Suitable monomers M3 include but are not limited to ethylenically unsaturated vinyl monomers such as 1,3-butadiene, isoprene, divinyl benzene, aromatic vinyl monomers such as styrene, alpha-methyl styrene; vinyl monomers such as acrylonitrile, methacrylonitrile; vinyl halides such as vinyl chloride; vinylidene halides such as vinylidene chloride; vinyl esters such as vinyl acetate, vinyl propionate, vinyl laurate; vinyl esters of versatic acid such as VeoVa™ 9 and VeoVa™ 10 (VeoVa is a trademark of Hexion); heterocyclic vinyl compounds; alkyl esters of mono-ethylenically unsaturated dicarboxylic acids such as di-n-butyl maleate and di-n-butyl fumarate and, in particular, esters of acrylic acid and methacrylic acid of formula $CH_2=CR_5-COOR_4$ wherein $R_5$ is H or methyl and $R_4$ is optionally substituted C1 to C20, more preferably C1 to C8, alkyl, cycloalkyl, aryl or (alkyl)aryl which are also known as acrylic monomers, examples of which are methyl (meth)acrylate, ethyl (meth)acrylate, butyl (meth)acrylate (all isomers), 2-ethylhexyl (meth)acrylate, isopropyl (meth)acrylate, propyl (meth)acrylate (all isomers), and hydroxyalkyl (meth)acrylates such as hydroxyethyl (meth)acrylate, 2-hydroxypropyl (meth)acrylate, 4-hydroxybutyl (meth)acrylate and their modified analogues like Tone M-100 (Tone is a trademark of Dow Chemical). Examples of suitable non-ionic monomers also include, for example, acrylonitrile, acrylamide, alkyl substituted acrylamide monomers or mixtures thereof.

Suitable non-ionic crosslinkable monomers M3 include allyl (meth)acrylate; acrylic and methacrylic esters of diols, triols, such as, ethylene di(meth)acrylate, 1,3-butylene di(methacrylate), 1,6-hexane di(meth)acrylate, trimethylolpropane triacrylate; divinyl benzene; dicyclopentadienyl (meth)acrylate; butadiene monomers; glycidyl (meth)acrylate; acetoacetoxyetlyl (meth)acrylate; acrolein, methacrolein; diacetone(meth)acrylamide; isocyanoatoethyl methacrylate, dimethyl meta-isopropenyl benzyl isocyanate or various mixtures thereof. Some of the non-ionic crosslinkable monomers that provide crosslinking after the coating film has dried require the addition of an appropriate co-reactant to the anionic dispersion.

Other ethylenically unsaturated monomers M3 that can be used are those monomers that contain a fatty acid derived ester-group such as oleyl (meth)acrylate, linoleyl (meth)acrylate, and linolenyl (meth)acrylate, synthesis of these monomers is described in J. Appl. Poly. Sci., 30, 4571-4582 (1985), the analogue vinyl esters or monomers derived from the addition reaction between glycidyl (meth)acrylate and a fatty acid such as mentioned in British patent application GB 2237276. These monomers can provide auto-oxidative drying properties polymer part of the vinyl copolymer. Other monomers that can be used comprise the vinyloxazoline diesters of unsaturated fatty acids like such as Dapro FX 521 commercially available from Elementis Specialities.

For the first emulsion polymerization preferably an anionic surfactant and optionally an additional non-ionic surfactant is added and the second emulsion polymerization is done optionally in presence of non-ionic surfactant either present from the first step and/or added after the first step before the second step.

Surfactants that can be utilized in the emulsion polymerization process are ionic or non-ionic surfactants. Non limiting examples of anionic emulsifiers are: potassium laurate, potassium stearate, potassium oleate, sodium decyl sulphate, sodium dodecyl sulphate, and sodium rosinate. Examples of non-ionic emulsifiers are: linear and branched alkyl and alkylaryl polyethylene glycol ethers and thioethers and linear and branched alkyl and alkylaryl polypropylene glycol ethers and thioethers, alkylphenoxy-poly(ethylenoxy) ethanols such as the adduct of 1 mole of octyl or nonylphenol to 5-50 moles of ethylene oxide, or the alkali salt or ammonium salt of the sulphate or the phosphate of said adducts. Also surfactants containing an olefinicaly unsaturated group that can participate in a free radical polymerization can be used. Suitable polymerizable surfactants include hemi-esters of maleic anhydride of the formula $M^{+-}OOC-CH=CHCOOR$ wherein R is C6 to C22 alkyl and $M^+$ is $Na^+$, $K^+$, $Li^+$, $NH4^+$, or a protonated or quaternary amine. Polyoxyethylene alkylphenyl ethers with an ethylenically unsaturated bond sold under the tradename Noigen® RN (ex DKS Co. Ltd.) such as NOIGEN RN-10™, NOIGEN RN-20, NOIGEN RN-30, NOIGEN RN-40™, and NOIGEN RN-5065™ or the sulphate thereof sold under the tradename Hitenol® BC (ex DKS Co. Ltd.) such as HITENOL BC-10™, HITENOL BC-1025™, HITENOL BC-20™, HITENOL BC-2020™, HITENOL BC-30™. MAXEMUL™ 6106 (available from Croda Industrial Specialties), which has both phosphonate ester and ethoxy hydrophilicity, a nominal C18 alkyl chain with an acrylate reactive group. Other representative reactive surfactants with phosphate ester functionalities suitable for such reactions include, but are not limited to, MAXEMUL™ 6112, MAXEMUL™ 5011, MAXEMUL™ 5010 (all available from Croda Industrial Specialties). Alternative reactive surfactants suitable for use with various embodiments of the present invention include sodium allyloxy hydroxypropyl sulphonate (available from Solvay-Rhodia as SIPOMER COPS-1™), ADEKA REASOAP SR/ER series such as ADEKA REASOAP ER-10, ER-20, ER-30 and ER-40, Akeda Reasoap SR-10, SR-20, SR-30 (all available from Asahi Denka Co., Ltd.) and allylsulphosuccinate derivatives (such as TREM LF-40™ available from Cognis)).

The amount of surfactant used is preferably 0.1 to 15 wt %, more preferably 01 to 8 wt %, still more preferably 0.1 to 5 wt %, especially 0.1 to 3 wt % and most especially 0.3 to 2 wt % based on the weight of the vinyl copolymer P1+P2.

The first emulsion polymerization can be carried out starting with a seed emulsion which can be the same or different in monomer composition of the first stage acid oligomer P1. If a polymer seed is used in the process, having the same monomer composition as P1, this seed polymer is part of the P1 polymer. If a polymer seed is used with a monomer composition different from that of P1, for example with a lower content of acid functional monomer, the seed may form a different phase in the dispersion particles and is not considered to be part of P1 for the purpose of any calculation herein.

A free-radical emulsion polymerization of vinyl monomers will require the use of free-radical-yielding initiator to initiate the vinyl polymerization. Suitable free-radical-yielding initiators include inorganic peroxides such as K, Na or ammonium persulphate, hydrogen peroxide, or percarbonates; organic peroxides, such as acyl peroxides including e.g. benzoyl peroxide, alkyl hydroperoxides such as t-butyl hydroperoxide and cumene hydroperoxide; dialkyl peroxides such as di-t-butyl peroxide; peroxy esters such as t-butyl perbenzoate and the like; mixtures may also be used.

The peroxy compounds are in some cases advantageously used in combination with suitable reducing agents (redox systems) such as Na or K pyrosulphite or bisulphite, sodium formaldehyde sulphoxylate, disodium 2-hydroxy-2-sulfinicaceticacid and iso-ascorbic acid. Metal compounds such as Fe. Ethylene diamine tetra acetate (EDTA) may also be used as part of the redox initiator system. Azo functional initiators may also be used. Preferred azo-initiators include azobis (isobutyronitrile), 2,2'-azo-bis(2-methyl butane nitrile) (ANBN); and 4,4'-azobis(4-cyanovaleric acid). It is possible to use an initiator partitioning between the aqueous and organic phases, e.g. a combination of t-butyl hydroperoxide, iso-ascorbic acid and Fe. EDTA. The amount of initiator or initiator system to use is conventional, e.g. within the range 0.05 to 6 wt % based on the total vinyl monomer(s) used.

The P2 polymerization may be carried out by any process known to those skilled in the art such as core/shell, gradient morphology, etc. The amine-functionalized polymer dispersions of the present invention may be prepared in accordance with any of a number of emulsion polymerization methods. For a general description of emulsion polymerization methods we refer to "Chemistry and Technology of Emulsion Polymerisation", Editor: A. van Herk, Blackwell Publishing Ltd, 2005.

Molecular weight control of copolymers P1 and P2 may be provided by using chain-transfer agents. In particular the first emulsion polymerization is preferably done in presence of a chain transfer agent to achieve the relatively low molecular weight of copolymer P1. Suitable chain transfer agent are mercaptans and halogenated hydrocarbons. Alternatively catalytic chain transfer agents such as Cobalt-chelates such as used in N. S. Enikolopyan et al, J. Polym. Chem. Ed, Vol 19, 879 (1981) can be used. Also alpha-methyl styrene dimer or oligomers of alpha-methyl styrene dimer can be used as explained in US 2007/0043156 A1 and U.S. Pat. No. 6,872,789. Yet another method to synthesize polymer with a well-defined molecular weight is the use of diarylethene. The use of diarylethene is described in detail in W. Bremser et al, Prog. Org. Coatings, 45, (2002), 95 and JP 3135151, DE 10029802 and US 2002/0013414. A commonly used diarylethene includes diphenylethene. Suitable chain-transfer agents include mercaptans such as n-dodecyl mercaptan, n-octyl mercaptan, t-dodecyl mercaptan, mercapto ethanol, iso-octyl thioglycolurate, C2 to C8 mercapto carboxylic acids and esters thereof such as 3-mercaptopropionic acid and 2-mercaptopropionic acid; and halogenated hydrocarbons such as carbon tetrabromide and bromo trichloromethane. Mercaptans are preferred.

According to the invention there has been provided a novel aqueous anionically stabilized polymer dispersion with exceptionally high amine group content combined with good dispersion stability and good coating properties. The invention thus also relates to an aqueous anionically stabilized polymer dispersion comprising dispersed particles having within the particles two or more separate phases, one phase comprising an acid functional oligomer having substantially no amine functional monomers and another separate phase comprising amine functional polymer having substantially no acid functional monomers and wherein the amount of amine functional monomers is at least 4 wt % relative to the total weight of the polymers or oligomers in the dispersed particles.

In particular, the invention relates to an aqueous anionic polymer dispersion obtainable by the above described process and more in particular to an aqueous anionic polymer dispersion comprising dispersed particles having within the particles separate first and second phases, wherein a. The first phase P1 comprises an acid functional oligomer comprising acid functional monomers and comprising less than 2 wt % (relative to the total weight of the acid functional oligomer), preferably substantially no, amine functional monomers and having a number average molecular weight $Mn_{P1}$ between 500 and 50,000 g/mole, preferably 1,000 and 30,000 g/mole (as determined by GPC using THF or THF in combination with acetic acid) and a Fox glass transition temperature $Tg_{P1}$ of at least 0, preferably 10, more preferably 15 and most preferably at least 20° C., and wherein b. the second phase P2 comprises an amine functional polymer comprising amine functional monomers M2* having sterically hindered secondary amine or tertiary amine groups and less than 2 wt % (relative to the total weight of the second monomer mixture), preferably substantially no acid functional monomers and typically having a number average molecular weight $Mn_{P2}$ between 1,000 and 1,000,000, preferably 10,000 and 800,000 g/mole, and a Fox glass transition temperature $Tg_{P2}$ of at least 0° C., c. said dispersion having a pH in a range between 6 and 11, preferably between 7.5 and 11, d. wherein $Tg_{P2}$ is lower than $Tg_1$ by at least 5° C., more preferably at least 7, 10 or 20° C., e. wherein preferably $Mn_{P2}$ is higher than $Mn_{P1}$, preferably by at least 1,000 g/mole, more preferably at least 2,000, 4,000 or 8,000 g/mole and f. wherein preferably $\delta_{TP1}$ is different from $\delta_{TP2}$ by at least 0.1, preferably at least 0.2 wherein $\delta_{TP1}$ and $\delta_{TP2}$ are the Hoy solubility parameters of the first (P1) and second (P2) phase, wherein both the Fox Tg as the Hoy parameter are calculated based on constituting monomers in P1 and P2 not including chain transfer agents or reactive surfactants.

In the aqueous anionic polymer dispersion of the present invention or aqueous coating compositions made therefrom, essentially all of the amine-groups in the polymer dispersion are maintained in a deprotonated state by ensuring the pH of the composition is in the range of 6-11, preferably 7.5-11.0, more preferably 8.5-10.5. The deprotonation of the amine functional groups helps to preserve the colloidal stability of the composition.

The aqueous anionically stabilized polymer dispersion of the invention is suitably used in coating compositions as a binder. In alternative A) the aqueous anionically stabilized polymer dispersion does not comprise a substantial amount of co-binder or in alternative B) further comprises co-binder B that is not reactive to the acid groups of the acid functional oligomer or to the amine groups on the amine functional polymer or in alternative C) further comprises a reactive co-binder C that is reactive to acid groups of the acid functional oligomer or to the amine groups on the amine functional polymer binder or to both or in alternative D) further comprises both a co-binder B and C. A not-substantial amount herein means less than 5, preferably 3 or 1 most preferably 0 wt % of the sum of the anionic polymer binder and co-binders. The reactive co-binder C is preferably selected from the group of water-soluble or dispersible polyepoxides.

In a coating composition according to alternative A, the anionic polymer dispersion is used as the only binder, i.e. without a co-binder, though it may contain the usual coating additives as described below. The coating composition according to alternative B may be in the form of a one-component system comprising the anionic polymer dispersion blended with an aqueous dispersion or a solution of a non-reactive co-binder B. In this case the composition does not comprise a co-binder that is reactive towards amine or acid groups of copolymer P1 or P2.

The aqueous anionically stabilized polymer dispersion according to alternative C is preferably in the form of a two-component system comprising two or more parts wherein one part comprises the anionically stabilized polymer dispersion and one other part comprises an aqueous solution or dispersion of the reactive co-binder C and/or of a separate crosslinker and one or both parts optionally comprise the non-reactive co-binder B.

More preferably the coating composition according to alternative C is in the form of a two-component system (kit of parts) comprising 2 or more parts wherein one part comprises the anionically stabilized polymer dispersion and one other part comprises a dispersion of the reactive co-binder C and one or both parts optionally comprise also a non-reactive co-binder B. In the latter case the anionically stabilized polymer dispersion is preferably blended with an aqueous dispersion of the reactive co-binder prior to application of the coating. After mixing the two components, the anionically stabilized polymer and the reactive co-binder are present in separate particles in the aqueous dispersion. In this embodiment, the reaction with the reactive co-binder is at least delayed by separation of reactive components in different particles. It is important to have control of the size of the different separate particles in alternative C. More preferably the size ratio of the different separate particles is designed to avoid the particle stratification during the film formation. In the particular case that one of the populations of particles migrates to either the film surface or bottom the reactivity of the two-component can be compromised. More preferably the size ratio of the different separate particles is designed to allow the immediate reaction of the particle population by their respective coalescence and inter-diffusion.

The non-reactive co-binders are preferably selected from the group of non-reactive aqueous vinyl dispersions, water-soluble vinyl polymers or oligomers, water reducible alkyds and polyester resins, alkyd emulsions drying by auto-oxidation, polyester emulsions, polyurethane dispersions, fatty acid modified polyurethane dispersions, urethane-acrylic urethane hybrid polymer dispersions, alkyd-acrylic hybrid polymer dispersions and preferably not a substantial amount of reactive co-binder.

The aqueous coating compositions of the present invention may optionally contain coating ingredients including but not limited to: pigments such as titanium dioxide or carbon black; extenders such as calcium carbonate, talc, clay, silica and silicates; fillers such as glass or polymeric microspheres, quartz, and sand; thickeners; rheology modifiers; dyes; sequestering agents; biocides; dispersants; anti-freeze agents; plasticizers; adhesion promoters; coalescents; wetting agents; waxes; surfactants; slip additives; crosslinking agents; defoamers; colorants; preservatives; freeze/thaw protectors and corrosion inhibitors.

Other optional coating additives include but are not limited to: co-solvents, reactive pigments, UV absorbers, antioxidants, and stabilizers. These optional components (as desired) may be added in any order of addition which does not cause an incompatibility between components. Components which do not dissolve in the aqueous carrier (such as pigments and fillers) can be dispersed in the polymer dispersion or an aqueous carrier or co-solvent using a high shear mixer. The advantage of the present invention is that commonly available paint additives and component can be used.

In embodiment C it is advantageous to formulate the coating composition in the presence of the anionically stabilized polymer dispersion and to add the co-reactive polymer dispersion prior to the application of the coating.

The aqueous coating compositions of the present invention can be used to provide coatings on suitable substrates such as wood and reconstituted wood products, cementitious substrates such as concrete or fiber cement, asphalt, stone, marble, clay, plastics, paper, cardboard, and metal (ferrous as well as non-ferrous). The fast drying nature of these compositions makes them particularly useful as road marking paints and as maintenance coatings for substrates where quick development of water-resistance is important.

The aqueous coating compositions of the present invention can be applied to desired substrates using conventional application techniques such as conventional or airless spray, roll, brush, curtain, flood, and dip-coating methods. Once applied to the substrate, the coating compositions of the present invention are typically cured at ambient temperatures, or in some cases at elevated temperatures depending of the substrate used.

In a particular embodiment of the coating composition, the anionically stabilized amine functional polymer dispersion is combined with a second component bearing functional groups that are co-reactive towards amines or carboxylic acids. This second co-reactive component can be a reactive polymer co-binder (alternative C) but also a low molecular weight compound or a separate compound only providing quaternised or protonated amine groups to the dispersed polymer. This embodiment is used as a so called two-component system, were the co-reactive second component is added to the anionic alkyl substituted amine functional polymer dispersion just prior to application to the substrate. Again care needs to be taken that the pH of the blend is in the range outlined above. Optionally a catalyst is added to the mixture to control the rate of reaction.

A preferred co-reactive functional group is an epoxy group:

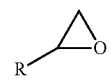

wherein R is any group that can link the epoxy group to a back-bone carrying at least one other epoxy group. This back-bone can be a polymer such as an addition, polycondensation or polyaddition polymer. The polyepoxy-functional polymer dispersion can be synthesized directly in water, for example by means of an emulsion polymerization process as described above using an ethylenically unsaturated monomer having epoxy functionality, or it can be synthesized using conventional processes followed by emulsification in water. It is hence preferred that the coating composition comprises a co-reactant selected from the group of polyepoxides. Polyepoxides used in the present invention can be water-soluble or water dispersible poly-functional epoxy-group bearing substances, pre-polymers or polymers or mixtures thereof, provided that they are compatible with the anionic dispersion of this invention.

Non limiting examples of water-soluble polyepoxides are glycidyl ethers of polyols such as 1,4-butanediol diglycidyl ether, ethylene glycol diglycidyl ether, polyethylene glycol diglycidyl ether, glycerol polyglycidyl ether, sorbitol polyglycidyl ether, etc. Polyepoxides that are dispersed in water can be made by means of emulsion polymerization using glycidyl methacrylate as epoxy-functional co-monomer Methods to synthesize an epoxy-functional acrylic dispersion are for example given in GB 2,206,591 B or WO 01/74930. Epoxy functional polymer dispersions are also commercially available from Allnex Netherlands BV under the trade-names Setaqua 8550, Setaqua 8554 and Setaqua 8555.

Epoxy resins composed of the reaction products of bisphenol A or bisphenol F with epichlorohydrin, can also be emulsified in water using either external or internal surfactants. Commercially available products are for example supplied by Hexion as EPI-REZ™ Epoxy Waterborne Resins or from Allnex under the trade name Bekopox® EP.

When the functional groups of the anionic amine functional polymer dispersion react with the epoxy-groups from the aqueous co-reactive polymer dispersion or emulsion, cross-linking of the polymer occurs due to, amongst others, the following reaction:

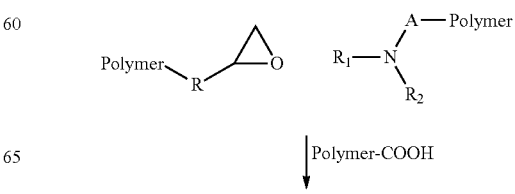

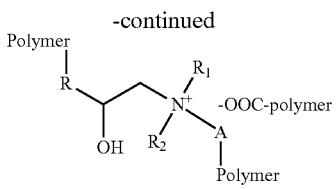

The reaction between the epoxy-function and the alkyl substituted amine function results in the formation of a quaternized amine crosslink, thus imparting a cationic functionality to the coating film. The presence of quaternized amine functionality in the dried coating can be beneficial as it can impart certain properties to the coating such as the prevention of the migration of acidic species from the substrate through the coating, such as extractable species form wood and knots such as tannins and tree-resins, or anti-microbial properties. Another reaction that can occur is the reaction between carboxylic acid groups present in the anionically stabilized amine functional dispersion and the epoxy groups of the co-reactant. Therefore the coating composition is particularly suitable for use in coating compositions and coatings providing anti-bleed or anti-microbial properties. For that purpose coating compositions normally comprise anti-bleed additives, in particular zinc oxide. The coating compositions of the invention have intrinsic anti-bleed properties and therefore need less or no anti-bleed additives, in particular an amount less than 50% of an amount that is normal for the envisaged use, preferably substantially no anti-bleed additives, preferably less than 5, 4, 3 or even less than 1 wt % relative to total weight of the coating composition.

The invention also relates to a cured coating having improved anti-bleed or anti-microbial properties comprising a cured coating composition of the invention; preferably with low or no anti bleed additives, comprising quaternised or protonated amine groups, preferably quaternary ammonium salt groups from the reaction of the amine groups of the anionic polymer and the epoxy groups of the reactive co-binder. Further the invention relates to the use of the aqueous anionically stabilized polymer dispersion of the invention for the preparation of a coating composition for the preparation of coatings having anti-bleed or anti-microbial properties.

The invention is further illustrated by the following examples:

Monomers Used

| Abbreviation | Chemical name | Tg homopolymers (K) |
|---|---|---|
| n-BA | n-Butyl acrylate | 219 |
| MMA | Methyl methacrylate | 378 |
| MAA | Methacrylic acid | 501 |
| STY | Styrene | 373 |
| DMAEMA | N,N-dimethylaminoethyl methacrylate | 292 |
| GMA | Glycidyl methacrylate | 340 |

Other Materials Used

| Abbreviation | Chemical name | Chemical nature |
|---|---|---|
| Surfactant 1 | Sodium lauryl sulphate | Anionic surfactant |
| Surfactant 2 | Reasoap$^{TM}$ SR-1025 (available from Adeka) | Reactive anionic surfactant |
| Surfactant 3 | Synperonic$^{TM}$ PE/F68 (available from Croda) | Non-ionic surfactant |
| OM | n-Octyl mercaptan | Hydrophobic chain transfer agent |
| ME | 2-Mercapto ethanol | Hydrophilic chain transfer agent |
| FF6 | Bruggolite$^{TM}$ FF6 M (available from Brueggemann Chemical) | Reducing agent |
| PAQ | Proxel$^{TM}$ AQ (available from Lonza) | Benzoisithiazolone based biocide solution. |
| APS | Ammonium persulphate | Free radical initiator |
| TBHP | Tertiary-Butyl hydroperoxde (70% aqueous) | Free radical initiator |
| DMEA | Dimethyl ethyl ethanol amine | Base |

Test Methods Used:

Molecular Weight Determination

The molecular weight and molecular weight distribution was determined using size exclusion chromatography. The size-exclusion apparatus used is an Alliance system consisting of a pump, autosampler and He-degasser (Degasys DG-1210 from Uniflows), equipped with a PLgel 5 μm MIXED-C 600×7.5 mm Column and a PIgel 5 μm guard kolom (50×7.5 mm—Polymer Laboratories). The Column oven (Separations Analytical Instruments) was set at 30° C. Tetrahydrofuran (THF—Extra Dry, Biosolve 206347)+2% acetic acid (Baker 6052) is used as eluent at a flow-rate of 0.8 ml/min. Carbon disulfide (Backer) is used as a marker. A Waters 410 refractive index is used as detector. The injection Volume is 100 μl at a concentration of 1.5 mg/ml. Polystyrene standards (Polymer Laboratories, Easical PS-1, 2010-0501 (M range 580 g/mole-8,500,000 g/mole) and Easical PS-2, 2010-0601 (M range 580 g/mole-400,000 g/mole)) were used for calibration using a third order polynomial. Software used for data-analysis is Empower (Waters).

Determination of Minimum Film-Formation Temperature (MFT)

The minimum film-formation temperature (MFT) was determined by using a Rhopoint MFFT-Bar 60 which has a temperature range from 0° C. to 60° C. Films were applied with a wet film thickness of 25 microns. The MFT was the lowest temperature at which the film showed no cracks.

Determination of Particle Size

Particle size was determined by dynamic light scattering using a Malvern Zetasizer model Nano—S90. The Z-average value was reported as the particle size. The Z-average diameter is the mean hydrodynamic diameter and is calculated according to the International Standard on dynamic light scattering ISO13321.

Determination of pH

The pH was measured using a Proline QIS pH meter.

Determination of Koenig Hardness

Koenig Hardness according to ASTM D 4366 was measured after applying a 100 μm wet film on glass and drying the film at 23° C./45% RH for 7 days.

Determination of Coffee Resistance

The coffee resistance was assessed as follows: 125 μm wet film applied on a Leneta® card. The film was dried at 23° C. at a relative humidity of 45% for 24 hours and then oven dried at 50° C. for 16 hours. A coffee solution is made using Nescafe® Original powdered coffee (4 grams) and boiling water (100 grams). The coffee solution is allowed to cool to room temperature before a droplet is applied to a square cut piece of wadding; this is then covered with a watch glass on the dried paint film on the white part of the Leneta® card. The coffee spot is then removed after a selected amount of time and the stain wiped over with a damp cloth to remove any residual coffee. The remaining mark is then visually judged and graded according to its severity, from 5 (no stain visible) to 1 (very visible coffee stain).

Determination of Water Resistance

The water resistance was assessed as follows: demineralized water was applied to a Leneta® card which has been prepared in the same way as described for the coffee testing. After the required test time the water is removed and the test spot allowed recovering for 1 hour before visually judging. A rating of 5-1 is given depending upon the severity of the mark left on the film surface. 5—no visible mark to 1—severe surface damage.

EXAMPLE 1.A

Preparation of a 1$^{st}$ Stage Aqueous Anionicallystabilized Polymer Dispersion A 3.5 liter reactor is charged with 1253.0 g of demineralized water, followed by the addition of 7.8 g of surfactant1; this is mixed under nitrogen atmosphere and heated-up to 80° C. A monomer emulsion with composition in Table 1 was prepared in parallel. When the desired temperature was reached, 105 g of the monomer emulsion together with 0.2 g of APS in 10.0 g of demineralized water was added to the reactor. The rest of the monomer emulsion and a solution of 7.8 g of APS and 358.1 g of demineralized water were fed to the reactor in 180 min and 200 min, respectively (at 85° C.). After the feeding process the reactor was held for 60 minutes, followed by the addition of a 25 wt % aqueous ammonia solution to increase pH up to a value of 8. The dispersion had a solids content of 26% and a particle size of 28 nm. The $M_n$ measured by GPC and Tg calculated according to Fox of the polymer were 17,286 g/mole and 19° C., respectively. The calculated solubility parameter δT was 19.43 $(J/m^3)^{1/2}$

TABLE 1

| Components | Amount (g) |
|---|---|
| Demineralized water | 295.50 |
| Surfactant 2 | 42.1 |
| MMA | 402.1 |
| n-BA | 358.1 |
| MAA | 67.2 |
| OM | 8.6 |
| ME | 4.3 |

1.B

Preparation of a 2$^{nd}$ Stage Anionically Stabilized Amine Functional Polymer Dispersion A 3.5 liter reactor is charged with 841.3 g of the 1$^{st}$ stage aqueous anionic polymer dispersion from example 1.A and heated-up to 70° C. under a nitrogen atmosphere. After reaching the desired temperature; the reactor was loaded with an aqueous solution of TBHP (1.5 g in 12.4 g demineralized water) and 0.62 g of surfactant 3. A monomer mixture with composition described in Table 2 was fed in 100 minutes into the reactor. In parallel a reducing agent aqueous solution consisting of 1.04 g FF6 and 124.4 g demineralized water, was fed during 120 minutes. The reactor was cooled-down to 60° C. followed by the addition a shot of 1.1 wt % demineralized water and 47.1 wt % of TBHP and the reducing agent aqueous solution, respectively (based on the initial addition at 70° C.). The reactor was cooled-down to 40° C. and a solution of 4.5 g of a biocide solution (FAQ) and 6.0 of demineralized water was added. The dispersion had a solids content of 37%, a particle size of 244 nm, 3.5 wt % acid functional monomer and 12.3 wt % amine functional monomer (on solid polymer P1+P2).

The difference in number average molecular weight between the first and the second stage polymer $\Delta Mn_{1B-1A}$ was determined to be 2418 g/mole, the difference in glass transition temperature between the first and the second stage polymer $\Delta Tg_{1B-1A}$ as calculated according to the Fox equation was 19° C. and the difference between the calculated solubility parameter between the first and the second stage polymer $\Delta\delta_{1B-1A}$ was 0.38 $(J/m^3)^{1/2}$

TABLE 2

| Components | Weight (g) |
|---|---|
| MMA | 62.2 |
| n-BA | 124.4 |
| STY | 37.3 |
| DMAEMA | 62.19 |

EXAMPLES 2-4

Preparation of Further Anionically Stabilized Amine Functional Polymer Dispersions Additional two-stage acid/amine functional dispersions were made using the process described in example 1B using the raw materials from table 3.

TABLE 3

| | Component | ex. 2 | ex. 3 | ex. 4 |
|---|---|---|---|---|
| pre-charge | Dispersion from example 1.A | 1347.00 | 1280.00 | 1208.00 |
| oxidizer | TBHP | 0.74 | 1.05 | 1.31 |
| solution | demineralized water | 1.77 | 1.70 | 1.60 |
| surfactant | Surfactant 3 | 0.28 | 0.41 | 0.51 |
| 2nd stage | MMA | 77.70 | 111.00 | 139.80 |
| monomer | n-BA | 33.30 | 47.50 | 59.89 |
| mixture | STY | 11.10 | 15.86 | 19.96 |
| | DMAEMA | 22.20 | 31.72 | 39.93 |
| reductor | FF6 | 0.53 | 0.74 | 0.93 |
| solution | demineralized water | 3.55 | 3.40 | 9.00 |
| biocide | PAQ | 7.50 | 4.50 | 4.50 |

The properties of the polymer dispersions obtained are given in table 4. The difference between the Tg of the first and the second stage polymer was for all samples equal to 19° C. and the calculated difference in solubility parameter $\Delta\delta_T$ was 0.29 $(J/m^3)^{1/2}$.

TABLE 4

Properties of anionically stabilized amine functional polymer dispersions.

| Example | % amine-functional monomer on solid polymer P1 + P2 | Particle size (nm) | Solids content (%) | pH | MFFT (° C.) |
|---|---|---|---|---|---|
| 2 | 4 | 47 | 32.1 | 8.8 | 17.0 |
| 3 | 6 | 54 | 32.5 | 9.0 | 23.0 |
| 4 | 7 | 71 | 36.5 | 9.0 | 27.0 |

COMPARATIVE EXAMPLE 5

Preparation of a Single Stage Anionically Stabilized Amine Functional Polymer Dispersion According to U.S. Pat. No. 5,709,714 example 8 with the Inclusion of DMAEMA A 3.5 liter reactor is charged with 589.2 g of demineralized water, followed by the addition of 7.8 g of surfactant1; this is mixed under nitrogen atmosphere and heated-up to 80° C. A monomer emulsion with the composition given in table 5 was prepared in parallel. When the desired temperature was reached, 33.4 g of MMA and 8.4 g of n-BA together with 1.2 g of APS dissolved in 10.0 g of demineralized water were added to the reactor. The system was let to react for 15 minutes. After this seeding stage, the monomer emulsion and a solution of 3.0 g of APS, 5.9 g of sodium bicarbonate and 294.6 g of demineralized water were fed to the reactor in 180 min and 200 min, respectively (at 85° C.). After the feeding process, the reactor was held for 60 min followed by the addition of an ammonia solution (10.3 g 25 wt % ammonia+106 g demineralized water). The reactor was cooled-down to 40° C. and a solution of 4.5 g of FAQ and 5.0 of water was added. The dispersion had a solids content of 25-28% (the rest of the solids remained as coagulum in the 60 μm filter) and a particle size of 1,300-1,500 nm.

TABLE 5

| Components | Amount (g) |
|---|---|
| Demineralized water | 353.5 |
| Surfactant 1 | 6.4 |
| Surfactant 2 | 6.4 |
| MMA | 94.3 |
| n-BA | 178.2 |
| MA | 29.5 |
| STY | 294.6 |
| DMAEMA | 196.4 |

EXAMPLE 6

Preparation of a $2^{nd}$ Stage Anionically Stabilized Alkyl Substituted Amine Functional Polymer Dispersion. Effect of Amine Concentration 70 mL micro-reactors (in series) were charged with 59.05 g of the $1^{st}$ stage aqueous anionic polymer dispersion from example 1A and heated to 70° C. under nitrogen atmosphere. After reaching the desired temperature; the reactors were loaded with aqueous solutions of TBHP (0.05 g+0.08 g demineralized water) and 0.02 g Surfactant 3 dissolved in 0.08 g demineralized water. A monomer mixture with the composition described in Table 6 (respective for every reactor 1-4) was fed in 100 minutes. In parallel a reducing agent aqueous solution (0.04 g FF6+0.16 g demineralized water) was fed during 120 min. The reactors were cooled-down to 60° C. followed by the addition a shot of 95.5 wt % and 100.0 wt % of TBHP and the reducing agent aqueous solution, respectively (based on the initial addition at 70° C.). The reactors were cooled-down to 40° C. and the dispersions filtered over 60 μm. The characteristics of the dispersions are presented in Table 6.

TABLE 6

| | Example | | | |
|---|---|---|---|---|
| | 6a | 6b | 6c | 6d |
| Monomer composition | | | | |
| MMA | 5.12 | 5.12 | 5.12 | 5.12 |
| n-BA | 2.19 | 2.19 | 2.19 | 2.19 |
| STY | 0.73 | 0.73 | 0.73 | 0.73 |
| DMAEMA | 0.21 | 0.47 | 0.95 | 1.48 |
| Characteristics | | | | |
| Particle size (nm) | 81 | 72 | 65 | 67 |
| pH | 9.1 | 9.2 | 9.3 | 9.3 |
| Solids content (%) | 30.40 | 31.50 | 31.40 | 33.20 |
| MFT (° C.) | 17 | 17 | 20 | 22 |

These examples demonstrate that high concentrations of the amino-functional monomer can be copolymerized in the compositions according to the invention.

COMPARATIVE EXAMPLE 7

Preparation of Anionically Stabilized Amine Functional Polymer Dispersion by Blending In a first step, an amino-functional single stage dispersion was prepared that is free of carboxylic acid groups as follows: a 3.5 liter reactor is charged with 747.0 g of demineralized water, followed by the addition of 1.5 g of surfactant 3; this is mixed under nitrogen atmosphere and heated to 80° C. A monomer emulsion with the composition given in Table 7 was prepared in parallel. When the desired temperature was reached, 5 wt % of the monomer emulsion together with 0.8 g of APS in 5.0 g of demineralized water was added to the reactor. The rest of the monomer emulsion and a solution of 5.6 g of APS, 5.05 g of sodium bicarbonate and 80.0 g of demineralized water were fed to the reactor in 120 min and 150 min, respectively (at 80° C.). After the feeding process the reactor was held for 60 min at 85° C. The dispersion had a solids content of 35%, a particle size of 217 nm and a pH of 8.7.

TABLE 7

| Components | Amount (g) |
|---|---|
| Demineralized water | 232.8 |
| Surfactant 2 | 30.8 |
| MMA | 331.3 |
| n-BA | 142.0 |
| STY | 47.4 |
| DMAEMA | 94.7 |

The waterborne amino-functional dispersion thus obtained was blended under stirring in different ratios with the aqueous anionic polymer dispersion from example 1A. The characteristic of these dispersions are described in Table 8.

TABLE 8

| | Example | | | | |
|---|---|---|---|---|---|
| | 9a | 9b | 9c | 9d | 9e |
| Blend Ratio (Amino/Carboxylic Acid) | | | | | |
| Weight amine functional dispersion according to Table 7 and process described above (g) | 80 | 60 | 50 | 40 | 20 |
| Weight polymer from example 1A (g) | 20 | 40 | 50 | 60 | 80 |
| Characteristics | | | | | |
| Particle size (nm) | 1170 | 218 | 226 | 220 | 214 |
| pH | 8.7 | 8.7 | 8.9 | 9.0 | 9.1 |
| Solids content (%) | 33.3 | 31.4 | 30.5 | 29.6 | 28 |
| MFT (° C.) | 37 | 36 | 32 | 6 | 3 |
| Stability | unstable | unstable | unstable | stable | stable |

From these results it is clear that it is advantageous to prepare P2 in the presence of P1.

EXAMPLE 8

Preparation of an Epoxy Functionalized Dispersion

A 3.5 liter reactor is charged with 632.3 g of demineralized water followed by the addition of 0.42 g surfactant 1; this is mixed under nitrogen atmosphere and heated up to 72° C. A monomer emulsion with the composition given in table 9 was prepared in parallel. When the desired temperature was reached, 5 wt % of the monomer emulsion together with 26.1 g of TBHP dissolved in 35.8 g of demineralized water were added to the reactor. After this a reducing agent aqueous solution (0.86 g FF6+28.6 g demineralized water) was added as a shot. The system was let to react for 30 min. The rest of the monomer emulsion and in parallel a reducing agent aqueous solution (5.9 g FF6+128.2 g demineralized water) was fed during respectively 180 min and 195 min. The contents of the reactor were cooled down to 65° C. followed by the addition a shot of 1.7 of TBHP and the reducing agent aqueous solution (1.8 g FF6+15 g demineralized water). The reactor was held for 30 min at 85° C. The dispersion had a solids content of 50-52%, a particle size of 245 nm and a pH of 8.1.

TABLE 9

| Components | Amount (g) |
|---|---|
| Demineralized water | 554.5 |
| Surfactant 3 | 61.6 |
| MMA | 540.8 |
| n-BA | 505.8 |
| OM | 4.2 |
| ME | 30.7 |
| Glycidyl methacrylate | 359.0 |

EXAMPLE 11

Application Performance Tests

Dispersions from examples 2-4 and 6a-6d were formulated into clear coatings by adding under continuous stirring 4 wt % of butyl diglycol to improve film-formation. The formulations were applied as described above and evaluated. The test results are presented in table 10.

TABLE 10

| Clear coat based on dispersion from example | Film appearance | Gloss 20° (G.U.) | Koenig Hardness 7 days (s) | Coffee resistance (1 h) | Water resistance (24 h) |
|---|---|---|---|---|---|
| 2 | Clear | 68 | 60 | 4.5 | 4.5 |
| 3 | Clear | 67 | 90 | 4 | 4.5 |
| 4 | Clear | 70 | 94 | 4 | 4.5 |
| 6a | Clear | 72 | 80 | 5 | 4.5 |
| 6b | Clear | 71 | 85 | 5 | 4.5 |
| 6c | Clear | 74 | 92 | 5 | 4.5 |
| 6d | Clear | 73 | 93 | 5 | 4.5 |
| 9d (comparative) | Hazy | 61 | 64 | 5 | 2 |
| 9e (comparative | Hazy | 68 | 79 | 5 | 2.5 |

This experiment demonstrates that the compositions according to the invention form glossy, homogeneous films with good water and stain resistance properties.

EXAMPLES 12-17

Two-Component Pigmented Coatings

Pigmented two component coatings were prepared using the ingredients given in table 11. First a mill base was prepared by high shear mixing until a fineness of less than 10 μm was obtained. In the let-down stage the anionically stabilized amine-functional dispersion together with butyl diglycol was added. This is component A of the coating. Prior to application component B is added to component A under stirring.

TABLE 11

| | | Component | Function | ex. 12 | ex. 13 | ex. 14 | ex. 15 | ex. 16 | ex. 17 |
|---|---|---|---|---|---|---|---|---|---|
| Component A | Mill base | Demineralized water | Solvent | 26.00 | 26.00 | 26.00 | 26.00 | 26.00 | 26.00 |
| | | Disperbyk 190* | Dispersant | 23.00 | 23.00 | 23.00 | 23.00 | 23.00 | 23.00 |
| | | Kronos 2310** | Pigment | 189.00 | 189.00 | 189.00 | 189.00 | 189.00 | 189.00 |
| | | Byk 024*** | Defoamer | 0.50 | 0.50 | 0.50 | 0.50 | 0.50 | 0.50 |
| | Let-down | Dispersion from ex. 2 | Resin | 230.00 | 230.00 | | | | |
| | | Dispersion from ex. 3 | Resin | | | 230.00 | 230.00 | | |
| | | Dispersion from ex. 4 | Resin | | | | | 230.00 | 230.00 |
| | | Butyl diglycol | Solvent | 9.20 | 9.20 | 9.20 | 9.20 | 9.20 | 9.20 |

TABLE 11-continued

| | Component | Function | ex. 12 | ex. 13 | ex. 14 | ex. 15 | ex. 16 | ex. 17 |
|---|---|---|---|---|---|---|---|---|
| Component B | Setaqua 8550**** | Resin | 230.00 | | 230.00 | | 230.00 | |
| | Dispersion from ex. 8 | Cross-linker | | 230.00 | | 230.00 | | 230.00 |

*Pigment dispersing agent from Byk Chemie
**Titanium dioxide from Kronos Inc.
***Defoamer from Byk Chemie
****Epoxy-functional acrylic dispersion from Allnex Netherlands B.V.

The coating compositions were applied as described above, cured and evaluated. The results are given in table 12.

TABLE 12

| | | ex. 12 | ex. 13 | ex. 14 | ex. 15 | ex. 16 | ex. 17 |
|---|---|---|---|---|---|---|---|
| Resistance properties | water (1 h) | 5 | 5 | 5 | 5 | 4 | 5 |
| | Ammonia (25% aq.) (1 h) | 5 | 4 | 5 | 4 | 3 | 5 |
| | Coffee (1 h) | 4 | 3 | 4 | 3 | 4 | 3 |
| Koenig Hardness (s) | (after 7 days) | 66 | 55 | 70 | 58 | 78 | 51 |

EXAMPLES 18-22

Preparation of Further Anionically Stabilized Amine Functional Polymer Dispersions. Effect of Mercaptanes and Amine Functional Monomer Addition Mode Additional two-stage acid/amine functional dispersions were made using the process described in example 1B using the raw materials from table 13.

TABLE 13

| | Component | ex. 18 | ex. 19 | ex. 20 | ex. 21 | ex. 22 |
|---|---|---|---|---|---|---|
| pre-charge | Dispersion from example 1.A | 1142.00 | 1105 | 1139 | 1054 | 1051 |
| oxidizer solution | TBHP | 1.29 | 1.25 | 1.29 | 1.36 | 1.36 |
| | demineralized water | 1.50 | 1.50 | 1.50 | 1.50 | 1.50 |
| surfactant | Surfactant 3 | 0.51 | 0.49 | 0.50 | 0.52 | 0.52 |
| 2nd stage monomer mixture | MMA | 139.10 | 134.60 | 138.80 | 155.20 | 154.70 |
| | n-BA | 59.61 | 57.69 | 59.47 | 38.80 | 38.69 |
| | STY | 19.86 | 19.22 | 19.82 | 19.40 | 19.34 |
| | DMAEMA* | 39.74 | 38.47 | 39.66 | 58.20 | 58.03 |
| | OM | — | — | 2.55 | — | 2.65 |
| | ME | — | — | 1.28 | — | 1.32 |
| reductor solution | FF6 | 0.88 | 0.85 | 0.88 | 0.93 | 0.93 |
| | demineralized water | 91.08 | 72.21 | 90.80 | 23.86 | 23.79 |
| biocide | PAQ | 4.47 | 4.33 | 4.50 | 4.33 | 4.33 |

(*90% of the total DMAEMA is added as pure feed after 60 min of pre-emulsion feeding, both feeds at the same feeding rate)

TABLE 14

Properties of anionically stabilized amine functional polymer dispersions.

| Example | % amine-functional monomer on solid polymer P1 + P2 | Particle size (nm) | Solids content (%) | pH | MFFT (° C.) |
|---|---|---|---|---|---|
| 18 | 7.3 | 117 | 33.8 | 9.3 | 27 |
| 19 | 7.3 | 136 | 35.3 | 9.3 | 25 |
| 20 | 7.3 | 86 | 34.3 | 8.9 | 17 |
| 21 | 10.8 | 214 | 32.5 | 9.2 | 29 |
| 22 | 10.8 | 160 | 31.0 | 9.2 | 24 |

The properties of the polymer dispersions obtained are given in table 14. The difference between the Tg of the first and the second stage polymer was for all samples is approximately 18-20° C. and the calculated difference in solubility parameter $\Delta\delta_T$ was 0.29 $(J/m^3)^{1/2}$.

EXAMPLES 23-24

Preparation of Further Anionically Stabilized Amine Functional Polymer Dispersions. Effect of DMEA Neutralization Additional two-stage acid/amine functional dispersions were made using the process described in example 1B using the raw materials from table 15. In the following examples the polymer P1 is neutralized using DMEA instead of ammonia.

TABLE 15

| | Component | ex. 23 | ex. 24 |
|---|---|---|---|
| pre-charge | Dispersion from example 1.A neutralized with DMEA | 1240 | 1237 |
| oxidizer solution | TBHP | 1.10 | 1.29 |
| | demineralized water | 1.50 | 1.50 |
| surfactant | Surfactant 3 | 0.42 | 0.42 |
| 2nd stage monomer mixture | MMA | 99.86 | 99.60 |
| | n-BA | 36.34 | 36.25 |
| | STY | 15.92 | 16.78 |
| | DMAEMA* | 65.71 | 65.55 |
| | OM | — | 2.16 |
| | ME | — | 1.08 |
| reductor solution | FF6 | 0.77 | 0.77 |
| | demineralized water | 28.30 | 28.20 |
| biocide | PAQ | 3.78 | 3.78 |

(*90% of the total DMAEMA is added as pure feed after 60 min of pre-emulsion feeding, both feeds at the same feeding rate)

TABLE 16

Properties of anionically stabilized amine functional polymer dispersions.

| Example | % amine-functional monomer on solid polymer P1 + P2 | Particle size (nm) | Solids content (%) | pH | MFFT (° C.) |
|---|---|---|---|---|---|
| 23 | 12.5 | 59 | 38.2 | 9.2 | 11 |
| 24 | 12.5 | 57 | 38.0 | 9.2 | 8 |

The properties of the polymer dispersions obtained are given in table 16. The difference between the Tg of the first and the second stage polymer was for all samples is approximately 18-20° C. and the calculated difference in solubility parameter $\Delta\delta_T$ was 0.29 $(J/m^3)^{1/2}$.

EXAMPLES 25-27

Preparation of Further Anionically Stabilized Amine Functional Polymer Dispersions. Effect of P1 Concentration Additional two-stage acid/amine functional dispersions were made using the process described in example 1B using the raw materials from table 17.

TABLE 17

| | Component | ex. 25 | ex. 26 | ex. 27 |
|---|---|---|---|---|
| pre-charge | Dispersion from example 1.A | 1108 | 966 | 875 |
| oxidizer solution | TBHP | 1.20 | 1.43 | 1.60 |
| | demineralized water | 1.50 | 1.50 | 1.50 |
| surfactant | Surfactant 3 | 0.49 | 0.54 | 0.58 |
| 2nd stage monomer mixture | MMA | 126.20 | 140.50 | 151.5 |
| | n-BA | 31.54 | 49.36 | 60.81 |
| | STY | 18.36 | 34.82 | 37.56 |
| | DMAEMA* | 80.90 | 61.47 | 58.71 |
| | OM | — | — | — |
| | ME | — | — | — |
| reductor solution | FF6 | 0.88 | 0.77 | 1.04 |
| | demineralized water | 22.58 | 28.30 | 27.11 |
| biocide | PAQ | 4.11 | 4.56 | 4.92 |

(*90% of the total DMAEMA is added as pure feed after 60 min of pre-emulsion feeding, both feeds at the same feeding rate)

TABLE 18

Properties of anionic amine functional polymer dispersions.

| Example | % amine-functional monomer on solid polymer P1 + P2 | Particle size (nm) | Solids content (%) | pH | MFFT (° C.) |
|---|---|---|---|---|---|
| 25 | 15.0 | 186 | 29.3 | 9.31 | 29 |
| 26 | 12.0 | 331 | 34.0 | 9.31 | 35 |
| 27 | 12.0 | 254 | 35.9 | 9.28 | 32 |

The properties of the polymer dispersions obtained are given in table 18. The difference between the Tg of the first and the second stage polymer was for all samples is approximately 18-22° C. and the calculated difference in solubility parameter $\Delta\delta_T$ was 0.30 $(J/m^3)^{1/2}$.

EXAMPLES 28-37

Knot-Bleeding Performance Tests

Pine panels with knots are coated by dipping the panels in the paint. Drying is done vertically for 15 minutes, followed by 16 hours at room temperature. Thereafter the panels are coated with a topcoat based on Setaqua 6785 available from Allnex Netherlands B.V. A coat of 250 gram/m² is applied by brush. Drying is done by a flash off of 1 hour, followed by 16 hours drying at 50° C. Then panels are placed in QUV with UV-A radiation. Cycle: 4 hours 60° C.+UV-A, 4 hours 40° C.+condensation. Panels are checked regularly for knot bleeding.

TABLE 19

Paint formulations.

| | Component | Function | ex. 28 | ex. 29 | ex. 30 | ex. 31 | ex. 32 | ex. 33 | ex. 34 | ex. 35 | ex. 36 | ex. 37 |
|---|---|---|---|---|---|---|---|---|---|---|---|---|
| Component A | Demi-water:butyl glycol 1:1 | Solvent | 4.10 | 4.10 | 4.10 | 4.10 | 4.10 | 4.10 | 4.10 | 4.20 | 4.20 | 4.20 |
| | Dispersion ex. 18 | Resin | 30.00 | — | — | — | — | — | — | — | — | — |
| | Dispersion ex. 19 | Resin | — | 30.00 | — | — | — | — | — | — | — | — |
| | Dispersion ex. 20 | Resin | — | — | 30.00 | — | — | — | — | — | — | — |
| | Dispersion ex. 21 | Resin | — | — | — | 30.00 | — | — | — | — | — | — |
| | Dispersion ex. 22 | Resin | — | — | — | — | 30.00 | — | — | — | — | — |
| | Dispersion ex. 23 | Resin | — | — | — | — | — | 30.00 | — | — | — | — |
| | Dispersion ex. 24 | Resin | — | — | — | — | — | — | 30.00 | — | — | — |
| | Dispersion ex25 | Resin | — | — | — | — | — | — | — | 30.00 | — | — |
| | Dispersion ex 26 | Resin | — | — | — | — | — | — | — | — | 30.00 | — |
| | Dispersion ex 27 | Resin | — | — | — | — | — | — | — | — | — | 30.00 |

TABLE 19-continued

Paint formulations.

| | Component | Function | ex. 28 | ex. 29 | ex. 30 | ex. 31 | ex. 32 | ex. 33 | ex. 34 | ex. 35 | ex. 36 | ex. 37 |
|---|---|---|---|---|---|---|---|---|---|---|---|---|
| Comp B | Setaqua 8550 * | Cross-linker | 53.20 | 53.23 | 53.23 | 37.26 | 37.26 | 29.81 | 29.81 | 26.61 | 29.81 | 29.81 |
| | Demineralized water | Solvent | 5.00 | 5.50 | 4.50 | — | — | 2.00 | 2.00 | — | — | — |
| | Total solids content (%) | | 39.97 | 40.10 | 39.97 | 39.77 | 39.10 | 40.00 | 39.91 | 37.00 | 39.20 | 39.97 |

The table 19 shows the formulation of the paint used for the process of coat-dipping the pine wood panels. The table 20 shows the results regarding the knot-bleeding performance. The pine wood panels were evaluated visually to assess the bleeding on the knots. The evaluation period stops when the knots present in the panel showed remarkably bleeding. It can be noticed that the dispersions developed can be used as a primer coating to decrease the occurrence of knot-bleeding.

TABLE 20

| | ex 28 | ex 29 | ex 30 | ex 31 | ex 32 | ex 33 | ex 34 | ex 35 | ex 36 | ex 37 |
|---|---|---|---|---|---|---|---|---|---|---|
| no knot-bleeding seen for (h) | 24 | 24 | 24 | 24 | 4 | 4 | 3 | 24 | 164 | 240 |

The invention claimed is:

1. A process for the preparation of an aqueous anionically stabilized polymer dispersion comprising the steps
   a. a first emulsion polymerization of a first monomer mixture comprising acid functional monomers M1 comprising acid groups and less than 2 wt % (relative to the total weight of the first monomer mixture) amine functional monomers M2 comprising amine groups to form a first phase polymer dispersion of an acid functional oligomer P1 having a number average molecular weight $Mn_{P1}$ between 500 and 50,000 g/mole (as determined by GPC using THF in combination with acetic acid) and a Fox glass transition temperature $Tg_{P1}$ of at least 0° C.,
   b. adding a base to increase the pH in a range between 6 and 11,
   c. a second emulsion polymerisation in the presence of the first phase polymer dispersion P1 of a second monomer mixture comprising amine functional monomers M2* having sterically hindered secondary amine or tertiary amine groups and less than 2 wt % (relative to the total weight of the second monomer mixture) acid functional monomers M1 to form a second phase of an amine functional polymer P2 having a Fox glass transition temperature $Tg_{P2}$ of at least 0° C.,
   d. wherein TgP2 is lower than TgP1 by at least 5° C. and
   e. wherein the resulting anionically stabilized polymer dispersion comprises dispersed particles having within the particles separate unmixed first and second phases, wherein the Fox Tg is calculated based on constituting monomers in the monomer mixtures not including chain transfer agents or reactive surfactants.

2. The process of claim 1 wherein $\delta_{TP1}$ is different from $\delta_{TP2}$ by at least 0.1, wherein $\delta_{TP1}$ and $\delta_{TP2}$ are the Hoy solubility parameters of phase P1 and P2, wherein the Hoy parameter is calculated based on constituting monomers in the monomer mixtures not including chain transfer agents or reactive surfactants.

3. The process of claim 1 wherein amine functional polymer P2 has a number average molecular weight $Mn_{P2}$ between 1,000 and 1,000,000 g/mole and wherein $Mn_{P2}$ is higher than $Mn_{P1}$.

4. The process of claim 1 wherein the first monomer mixture comprises
   a. between 1 and 20 wt % of the acid functional monomers M1,
   b. less than 1 wt % amine functional monomers M2,
   c. between 80 and 99 wt % monomers M3 other than acid- and amine functional monomers
   and wherein the second monomer mixture comprises
   d. between 2 and 45 wt % of the amine functional monomers M2* having sterically hindered secondary amine or tertiary amine groups,
   e. less than 1 wt % acid functional monomers M1,
   f. between 55 and 98 wt % monomers M3 other than acid- and amine functional monomers
   wherein the wt % are relative to the total weight of the first and second monomer mixture respectively,
   wherein the amount of the second monomer mixture in wt % relative to the total of the first and second monomer mixture is between 20 and 80 wt % and
   wherein the monomers M3 are monomers comprising substantially no ionisable groups.

5. The process of claim 1, wherein for the first emulsion polymerisation an anionic surfactant and optionally an additional non-ionic surfactant is added and the second emulsion polymerisation is done optionally in presence of non-ionic surfactant either present from the first step and/or added after the first step before the second step.

6. The process of claim 1, wherein the amine functional monomers M2* having sterically hindered secondary amine or tertiary amine groups are an alkyl substituted amine functional ethylenically unsaturated monomers defined by formula I:

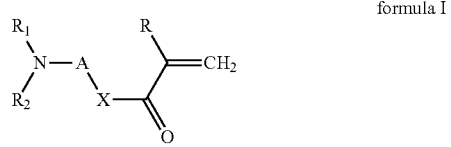

formula I wherein R is hydrogen, an alkyl group having 1 to 4 carbon atoms or a phenyl group, A is an alkylene group having from 2 to 10 carbon atoms, R1 and R2 are each independently an alkyl group having 1 to 12 carbon atoms and, in case of a sterically hindered secondary amine R1 is hydrogen and R2 is a sterically hindering group comprising 4 or more carbon atoms and X is oxygen or nitrogen.

7. An aqueous anionically stabilized polymer dispersion comprising dispersed particles having within the particles separate first and second phases, wherein a. the first phase comprises an acid functional oligomer P1 comprising acid functional monomers and comprising less than 2 wt % (relative to the total weight of the acid functional oligomer) amine functional monomers M2 and having a number average molecular weight $Mn_{P1}$ between 500 and 50,000 g/mol (as determined by GPC using THF in combination with acetic acid) and a Fox glass transition temperature $Tg_{P1}$ of at least 0° C., and wherein b. the second phase comprises an amine functional polymer P2 comprising amine functional monomers M2* having sterically hindered secondary amine or tertiary amine groups and less than 2 wt % (relative to the total weight of the second monomer mixture) acid functional monomers M1 and having a Fox glass transition temperature $Tg_{P2}$ of at least 0° C., c. said dispersion having a pH in a range between 6 and 11, d. wherein $Tg_{P2}$ is lower than $Tg_{P1}$ by at least 5° C. and e. wherein $\delta_{TP1}$ is different from $\delta_{TP2}$ by at least 0.1 wherein $\delta_{TP1}$ and $\delta_{TP2}$ are the Hoy solubility parameters of the first and second phase, wherein both the Fox Tg and the Hoy parameter are calculated based on constituting monomers in the monomer mixtures not including chain transfer agents or reactive surfactants.

8. The aqueous anionically stabilized polymer dispersion of claim 7 which in alternative A) does not comprise a substantial amount of co-binder or in alternative B) further comprises co-binder B that is not reactive to the acid groups of the acid functional oligomer or to the amine groups on the amine functional polymer or in alternative C) further comprises a reactive co-binder C that is reactive to acid groups of the acid functional oligomer or to amine groups on the amine functional polymer binder or to both or in alternative D) further comprises both a co-binder B and C, wherein not a substantial amount means less than 5 wt % of the sum of the anionic polymer binder and co-binders.

9. The aqueous anionically stabilized polymer dispersion of claim 8 according to alternative B) in the form of a one-component system comprising the anionically stabilized polymer dispersion blended with an aqueous dispersion or solution of the non-reactive co-binder or according to alternative C) in the form of a two-component system comprising 2 or more parts wherein one part comprises the anionically stabilized polymer dispersion and one other part comprises an aqueous solution or dispersion of the reactive co-binder C and/or of separate crosslinker and one or both parts optionally comprise the non-reactive co-binder B.

10. The aqueous anionically stabilized polymer dispersion of claim 8 wherein reactive co-binder C is selected from the group of water-soluble or dispersible polyepoxides.

11. A method for the preparation of a coating composition comprising blending of the aqueous anionically stabilized polymer dispersion of claim 7 with a co-binder.

12. A coating composition comprising an aqueous anionically stabilized polymer dispersion of claim 7 and further coating additives.

13. A cured coating comprising an aqueous anionically stabilized polymer dispersion of claim 7 comprising quaternised or protonated amine groups.

* * * * *